United States Patent [19]

Hulin et al.

[11] 4,416,507

[45] Nov. 22, 1983

[54] METHOD FOR IN SITU SPLICING OPTICAL FIBER CABLES

[75] Inventors: Jean P. Hulin; Andre Bouvard; Patrick Le Maitre, all of Conflans Sainte Honorine, France

[73] Assignee: Lignes Telegraphiques et Telephoniques, Conflans Saint Honorine, France

[21] Appl. No.: 261,178

[22] PCT Filed: Mar. 13, 1981

[86] PCT No.: PCT/FR81/00038

§ 371 Date: Apr. 30, 1981

§ 102(e) Date: Apr. 30, 1981

[87] PCT Pub. No.: WO81/02794

PCT Pub. Date: Oct. 1, 1981

[30] Foreign Application Priority Data

Mar. 14, 1980 [FR] France .............................. 80 05737

[51] Int. Cl.³ .............................................. G02B 7/26
[52] U.S. Cl. ................................................. 350/96.22
[58] Field of Search ............... 350/96.20, 96.21, 96.22, 350/320

[56] References Cited

U.S. PATENT DOCUMENTS

| 4,103,987 | 8/1978 | Kersten ............................ 350/96.21 |
| 4,108,534 | 8/1978 | Le Noane et al. ............... 350/96.21 |
| 4,110,000 | 8/1978 | Bogar et al. ..................... 350/96.21 |
| 4,172,746 | 10/1979 | Le Noane et al. ........... 350/96.21 X |
| 4,174,882 | 11/1979 | McCartney ..................... 350/96.21 |

FOREIGN PATENT DOCUMENTS

2420777  10/1979  France .............................. 350/96.21

Primary Examiner—John D. Lee
Attorney, Agent, or Firm—Roland Plottel

[57] ABSTRACT

For splicing two optical fiber cables placed within a grooved dielectric support, centering and alignment of the fibers are carried out by means of centering pins inserted in longitudinal openings of an annular flange rigidly fixed to a terminal connector forming an extension of the grooved dielectric support, at least one of these openings being located at a distance from the cable axis which is greater than the radius of the cable.

8 Claims, 13 Drawing Figures

FIG.1

FIG_2

FIG. 3

FIG_4A

FIG_4

METHOD FOR IN SITU SPLICING OPTICAL FIBER CABLES

This invention relates to a method and apparatus for in situ splicing two optical fiber transmission cables each comprising a plurality of cable elements beneath a set of protective jackets.

Different types of optical fiber cable structures are known. One of them consists of a dielectric cylindrical support reinforced along its axis and having grooves regularly distributed over its periphery, each of said grooves containing an optical fiber. Such a cable structure is more particularly described in U.S. patent Application, Ser. No. 877,872, filed by the Assignee on Feb. 15, 1978 (now abandoned) and entitled "Cable incorporating optical fibers".

The problem of splicing two multifiber cables of the grooved cylindrical type has already formed the subject of a number of publications. By way of example, mention can be made to French Pat. No. 2,360,896 filed on Aug. 3, 1976 by the Assignee, and French Patent No. 2,420,777 filed on Mar. 24, 1978 by the Assignee, describing solutions which are particularly suitable for the cable structure described hereinbefore.

The methods of cable splicing described up to the present time are distinguished by the fact that accuracy of centering of the two cables is dependent both on an element placed along the axis of the cables and on the external mechanical structure for protection of the splice. An arrangement of this type entails the need for centering by means of two successive and relatively independent devices, with the result that harmful mechanical stresses are liable to arise at the level of the connection. The maximum accuracy of a centering operation of this type is obtained along the axis whereas the optical fibers are disposed in a circle which is concentric with this axis and the radius of said circle is a factor by which the error of alignment of the fibers is multiplied. Furthermore, the known methods produce a fixed connector so designed that disassembly of this latter involves destruction of important elements which prevent any possibility of reassembly.

The aim of the present invention is to overcome these disadvantages by proposing a method of splicing and apparatus for the application of this method which make it possible both to minimize the degree of skill which an operator must have in order to perform the splicing operation and the time required for this operation irrespective of the number of fibers carried by the cable.

To this end, the invention relates to a method of in situ splicing two optical fiber transmission cables, each comprising a dielectric support in which are housed optical fibers and involving the following operating steps performed on each cable end:

the cable ends are stripped over a predetermined length;

the fibers thus freed are opened-out;

the support which has been freed from its fibers is cut at right angles to its axis and a member forming an extension or terminal connector and provided with grooves is fixed on the end of said support;

the fibers are turned down into the grooves of said terminal connector and are rigidly fixed therein;

said terminal connector as well as the fibers carried by this latter are cut at right angles to the axis of said connector;

each support-connector assembly is fixed in position by rigidification means; and the two cables are aligned by alignment means.

The method is characterized in that the step involving alignment of the two cables consists in introducing within the terminal connector of the first cable at least one centering pin into a longitudinal opening formed in each terminal connector, said pin projecting from the cutting face of the terminal connector and engaging in a corresponding opening of the terminal connector of the second cable.

According to another feature of the invention, each support is cylindrical and each terminal connector comprises a member forming an annular flange in which are made the longitudinal openings, the distance from each opening to the axis of the terminal connector being greater than the radius of the support.

Accuracy of alignment of the two cables to be connected is therefore ensured by means of centering-pin assemblies fixed to two terminal connectors and disposed over a circle which is concentric with the cable structure and the radius of which is longer than the radius of the cable.

Thus the use of centering pins makes it possible to obtain the positioning accuracy required for fiber-to-fiber connection without entailing the need for pin-positioning within closer tolerance limits than those obtainable by means of ordinary methods of manufacture, especially fine molding.

According to the invention, the mechanical protection of the splice is ensured by means of a set of members forming a fluid-tight structure flexibly mounted with respect to the cable, i.e. a structure which is mechanically isolated from the splice by means of elastic elements which prevent transmission of mechanical stresses to the cable. In consequence, said structure does not play any part in either the centering or the alignment of the cables.

Other features of the invention will be more apparent upon consideration of the following description and accompanying drawings, wherein.

Figure 1:
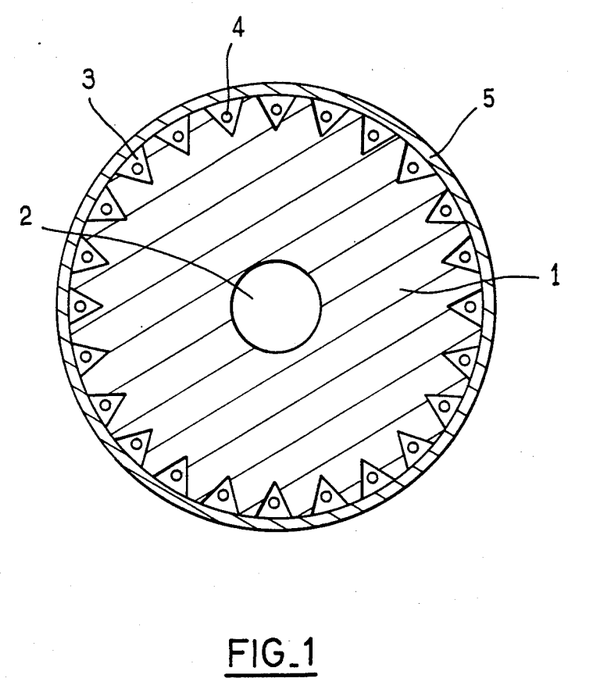
FIG. 1 is a transverse sectional view of an optical fiber cable to which the method according to the invention applies.

There is shown in FIG. 1 a cross-section of a cable element, for example a grooved cylindrical type structure, to which the method of the invention applies. A cable of this type comprises a grooved dielectric cylindrical support 1 extruded around a core 2 which is intended to rigidify the cable and to absorb longitudinal stresses. The grooves such as those designated by the reference numeral 3 are uniformly distributed on the external surface of the support 1. These grooves are either longitudinal or helical with a single or alternating pitch. An optical fiber such as the fiber designated by the reference numeral 4 is placed within each groove 3. The grooves 3 have for example a V-shaped profile. It will be readily apparent that lipped grooves as described in U.S. patent application, Ser. No. 877,872 filed by the Assignee on Feb. 15, 1978 and entitled "Cable incorporating optical fibers" may also be employed without thereby departing from the scope of the invention. A tape winding 5 completes the structure of the cable element. The cable is protected against external agents by means of jackets (not shown in the drawings but well-known to those versed in the art), the character of which depends on the intended use of the cable.

Figure 2:
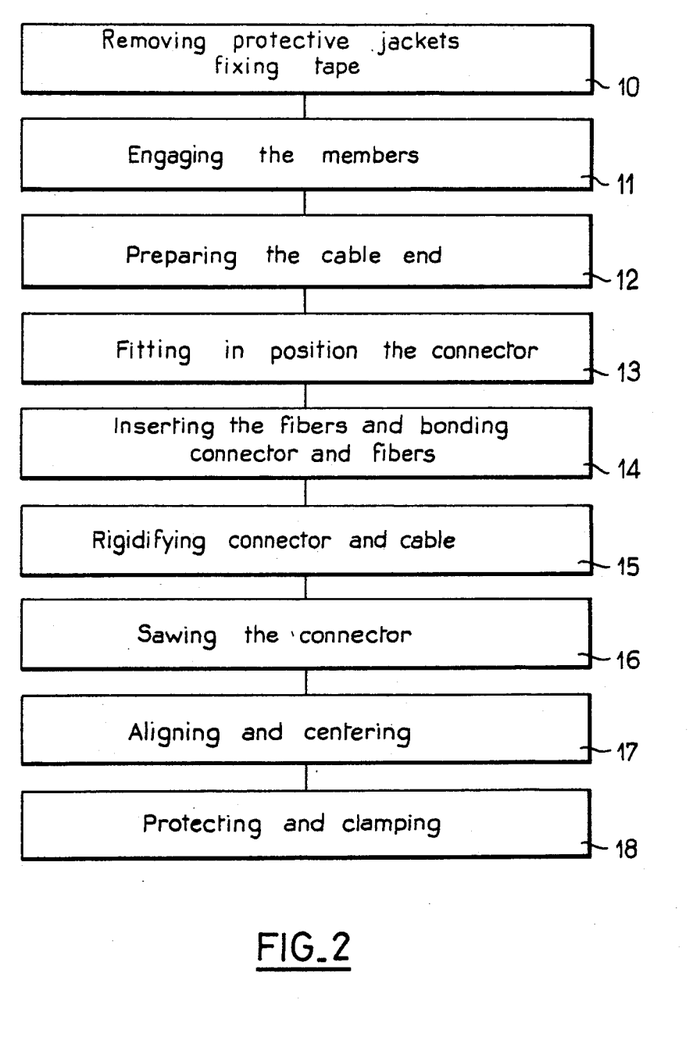
FIG. 2 is a block diagram of the different connecting steps.

FIG. 2 provides a schematic summary of the method of splicing in accordance with the invention as will hereinafter be described in greater detail. It is apparent that operations performed on site are preceded by preparation in factory of the terminal connectors and different members required for the formation of the splice and mechanical protection of this latter. Preferably, the terminal connectors are formed by fine molding of a symmetrical part (shown in FIG. 3) which is cut along its plane of symmetry so as to provide two paired terminals which will preferably be employed on the two cable ends to be spliced as has already been mentioned in French Patent Application No. 2,420,777 filed on Mar. 24, 1978 by the present Assignee. However, this condition is not essential and accuracy of fine molding permits interchangeability of terminal connectors.

Figure 6:
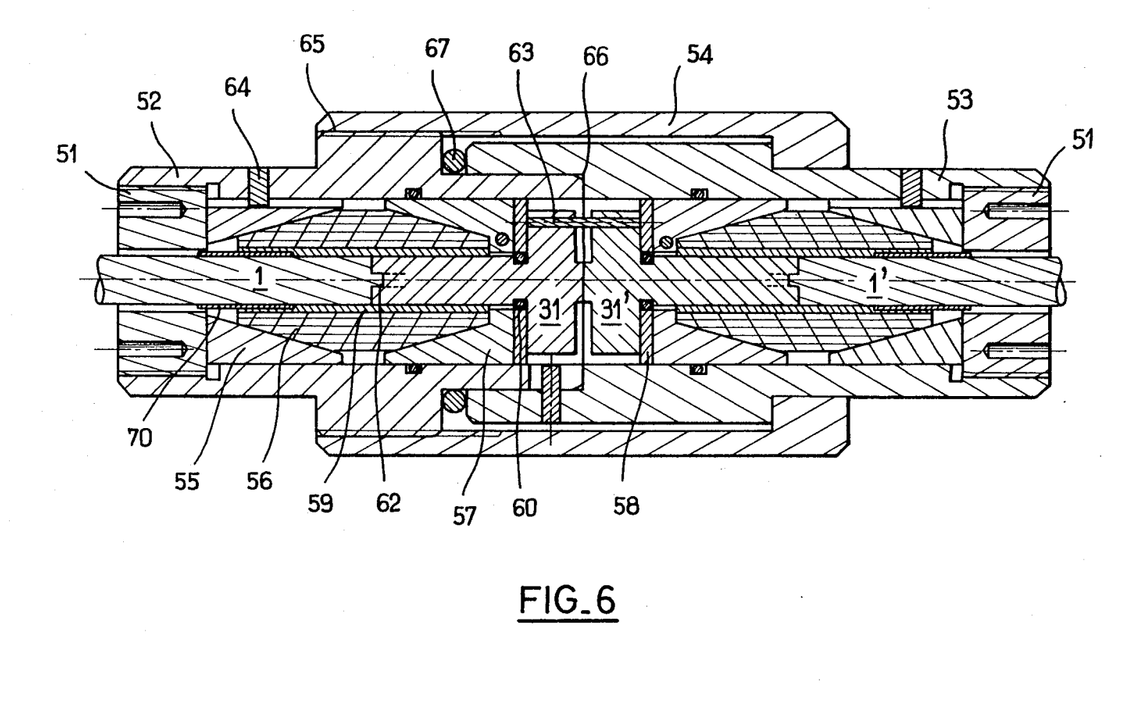
FIG. 6 is a longitudinal sectional view of a completed connection according to a first embodiment.
Figure 11:
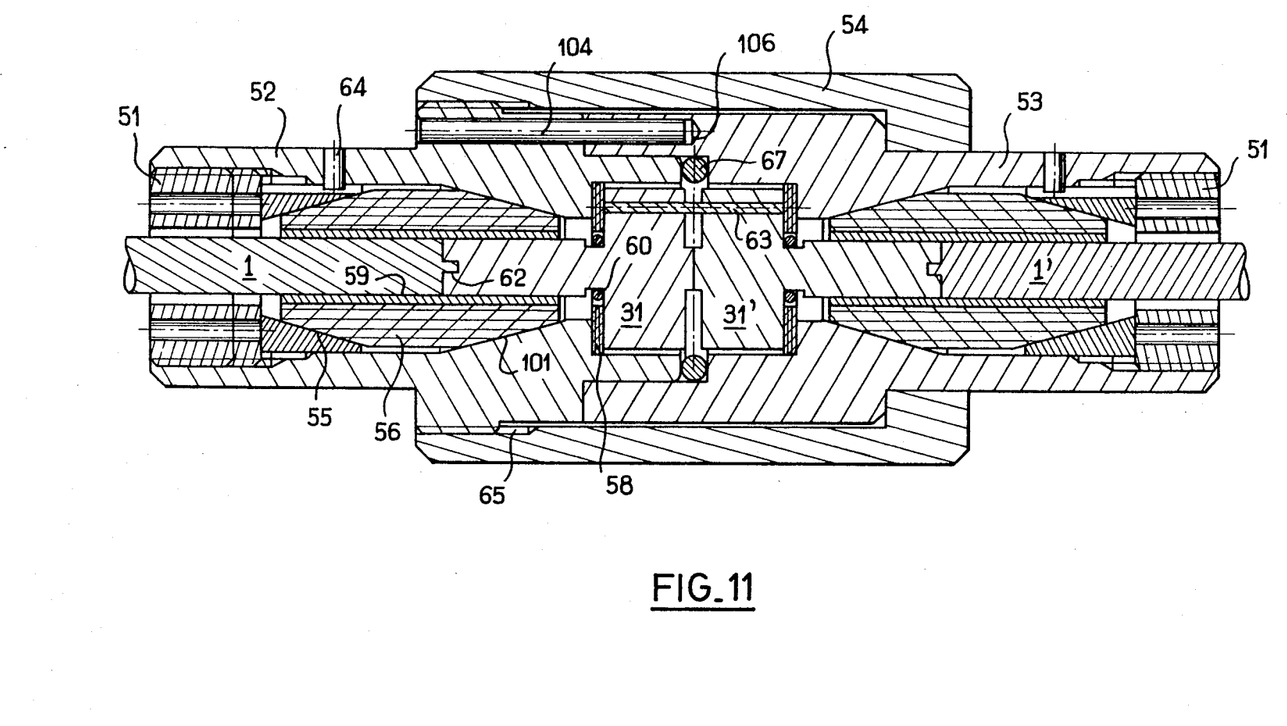
FIG. 11 is a view similar to that of FIG. 6 according to a second embodiment.

On the cable installation site, each cable is held in place in vice-like members on a splicing bench. And, the cable end is stripped over a predetermined length by removal of the protective cable cladding and jackets in such a manner as to retain the element as shown in FIG. 1 and the tape 5 is fixed by means of an elastic sleeve (Operation 10). The parts are then placed on the cable-end to be connected (Operation 11). The assembly operation is begun by threading on the cable jacket and in the intended order of use the mechanical protection members 51, 52, 53 and 54 in FIGS. 6 or 11 which are intended to ensure mechanical protection of the splice. The mechanical parts provided for rigidifying the cable-terminal connection are then engaged; as shown in FIGS. 6 or 11, these parts consist of the conical ring 55, the biconical elastic seal 56, the locking wedge 57 (FIG. 6), the flat elastic seal 58 as well as the cylindrical sleeve 59 which is close in diameter to the support 1, and the O-ring seal 60 which has a slightly smaller diameter. The next step consists in preparing the end of the cable (Operation 12 in FIG. 2) by removing the tape, freeing the fibers from their grooves, opening-out the fibers towards the rear and fixing the fiber ends in a suitable holder. The fiber ends are treated in order to remove the protective cladding which surrounds the active portion of the fiber. Preparation of the cable end calls for adjustment of the length of the support 1, if necessary after correcting the pitch of the helix. The support 1 is removed over a distance of a few centimeters, thus allowing the core 2 to project as shown at 62 in FIGS. 6 or 11. The stud thus formed serves to guide a member forming a grooved terminal connector which is fitted in position (Operation 13) by engaging it on the stud and by visually aligning the grooves of the connector with those of the support. The fibers are then freed from the tool in which they were maintained behind the coupling zone and inserted in the grooves of the terminal connector, in which they are fixed by bonding (Operation 14).

The terminal connector is secured to the cable by positioning and heating a heat-shrinkable sleeve designated in FIGS. 6 or 11 by the reference numeral 59 (Operation 15). The next step consists in sawing the terminal connector provided with fibers (Operation 16). The cable end is completed by positioning the mechanical parts for rigidifying the assembly consisting of cable and terminal connector. The same operations are repeated on the end of the second cable to be connected. Alignment of the two terminal connectors by means of centering pins (Operation 17) is then carried out, this step being followed by assembly of the members for protecting the splice and clamping (Operation 18).

The most difficult operation after positioning of the fibers at the bottom of their grooves is that of aligning and centering the two terminal connectors (Operation 17) as will hereinafter be explained in greater detail. These operations are greatly simplified in comparison with the equivalent operations involved in methods of the prior art by making use of centering and aligning means disposed concentrically with respect to the structure on a circle having a diameter which is greater than that of the cable to be connected, thus permitting precise alignment between fibers.

Figure 3:
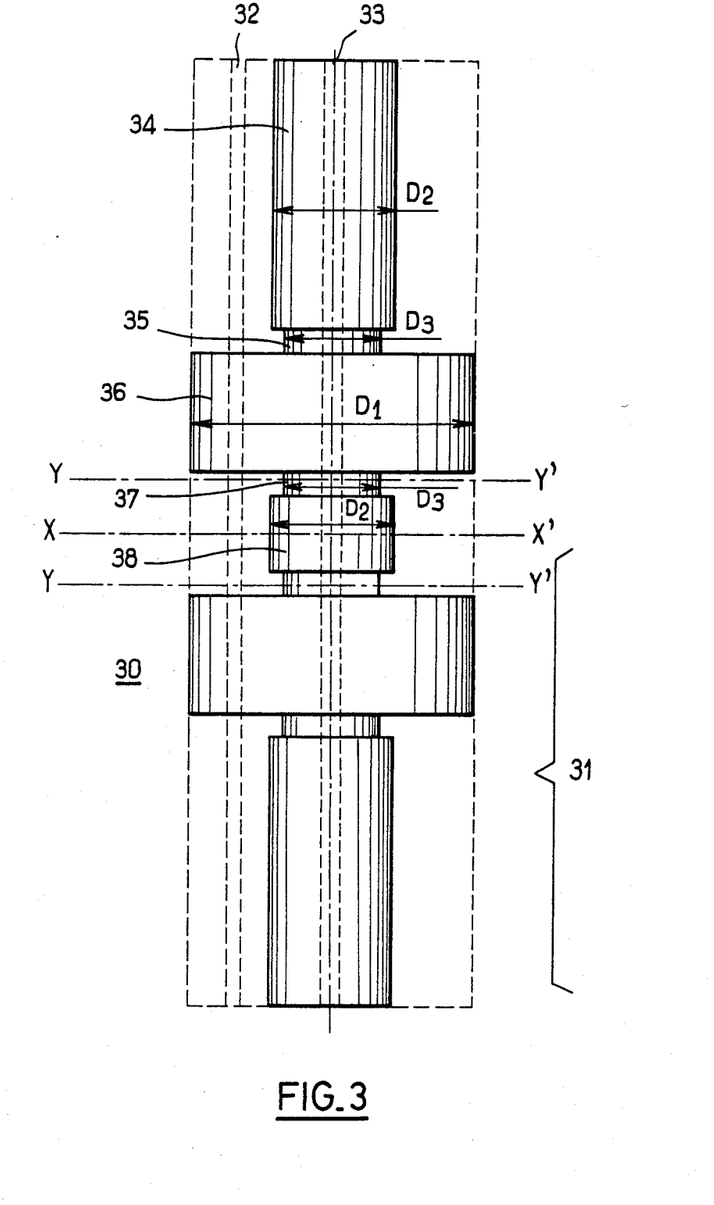
FIG. 3 is a view in elevation showing a terminal connector during manufacture.

FIG. 3 illustrates a member 30 corresponding to a pair of terminal connectors 31. Use is made of a cylindrical part having a contour as shown in dotted line in the figure and having grooves of substantial depth, the bottom of which reproduces the profile of the grooves 3 of the cable support 1, said grooves being spaced in the same manner with respect to the longitudinal axis of the member. The member 30 is further provided over its entire length with at least one peripheral bore such as 32 serving as an angular indexing member, and in some cases with a central bore 33. Such a cylindrical member 30 of diameter D1 is obtained by fine molding of a resin which is polymerizable in the cold state and has low shrinkage such as, for example, methyl methacrylate. Preferably, the resin is loaded with quartz powder in order to reduce the dimensional temperature sensitivity of the member and to increase its resistance to wear. Moreover, the length of the member 30 is chosen so as to permit subsequent machining of two terminal connectors simultaneously. After machining, the member 30 is therefore constituted by two halves which are symmetrical with respect to the central plane represented by the line X—X'. Each half corresponding to one terminal connector 31 has a tail portion 34 of relatively substantial length having a diameter D2 equal to that of the cable support. Said tail portion terminates by a first channel 35 having a diameter D3 which is smaller than D2 and chosen so as to be slightly larger than the diameter of the circle inscribed by the bottoms of the grooves. The depth of the grooves at the level of the channel 35 is close in value to the radius of the optical fibers employed in the cable. When the fibers are inserted in the grooves, they therefore project from the terminal connector at the level of the channel 35. This feature is employed both in order to position the fibers during the connecting operation and in order to bond them permanently within the grooves of the terminal connector. An annular flange 36 having the initial diameter D1 remains the only part of the terminal connector which retains the bores 32, thus ensuring accurate relative angular positioning of the bores carried by the two annular flanges. The terminal connector 31 terminates by a second channel 37 having the same diameter D3 as the channel 35 which is machined in a head 38 having the diameter D2. The line Y—Y' represents the planes of cutting of the terminal connectors after mounting on the cable end. In order to effect coupling of the terminals, the faces defined by the cutting operation along the planes Y—Y' of the terminal connectors of the two cables to be connected are applied against each other. Accuracy of alignment of the axes of the fibers is dependent on identity of the angular spacing of the grooves in the two terminal connectors and on regularity of profile of the bottom portions of grooves of the molded part. Centering of the terminal connectors is carried out by making use of pins adapted to cooperate with the bores 32. Experience has shown that the precision obtained by molding makes it possible to pair separately molded terminal connectors, thus providing the method in accordance with the invention with a higher degree of flexibility and making it possible to mount terminal connectors on cable ends in factory.

Figure 4:
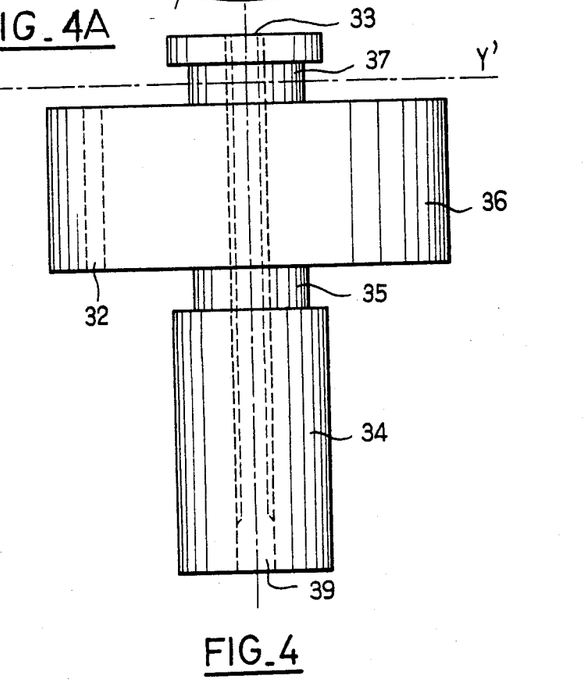
FIG. 4 is a front view showing a variant of a manufactured terminal connector.
Figure 4A:
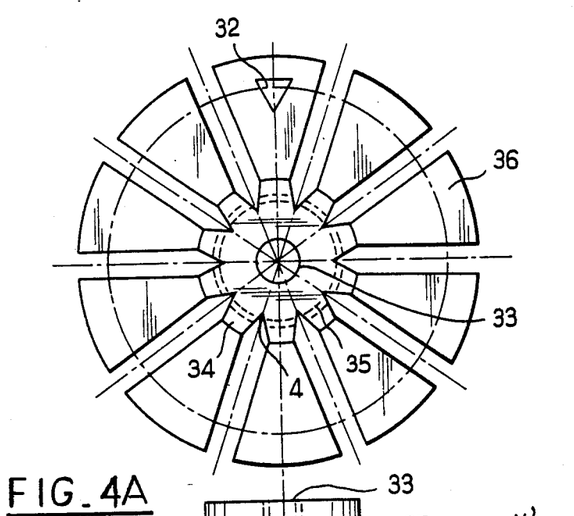
FIG. 4A is a top view of the connector of FIG. 4.

FIGS. 4 and 4A illustrates a first variant of a single terminal connector. As shown at 39, the bore 33 is enlarged at the beginning of the tail portion 34 of the terminal connector to the dimensions of the cable core 2. FIG. 4 shows a front view of the terminal connector provided with a single peripheral bore 32 of triangular cross-section and FIG. 4A is a top view of the terminal connector showing the profile of the grooves within the annular flange 36. The triangular cross-section of the bore 32 is preferred to a circular cross-section since it facilitates assembly and disassembly of the centering pin which is inserted by force in said bore 32.

Figure 5:
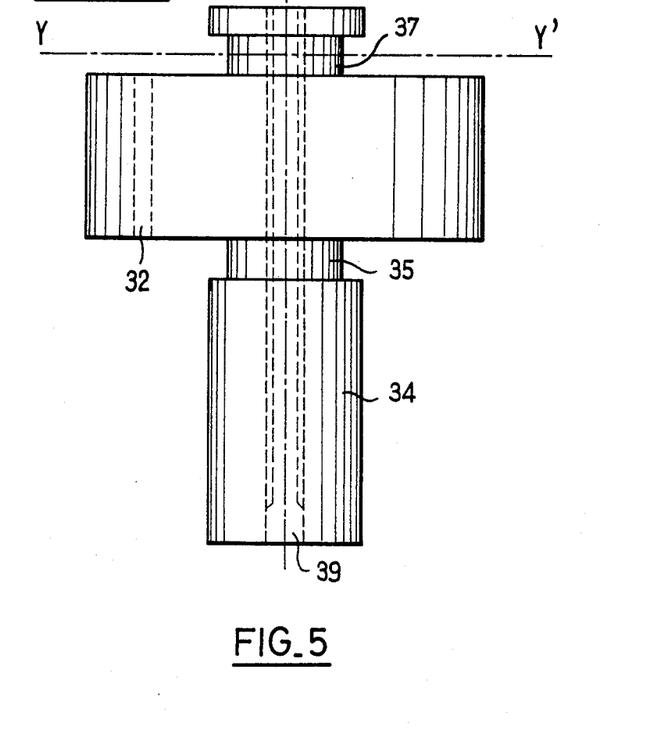
FIG. 5 is a front view showing another variant of a manufactured terminal connector.
Figure 5A:
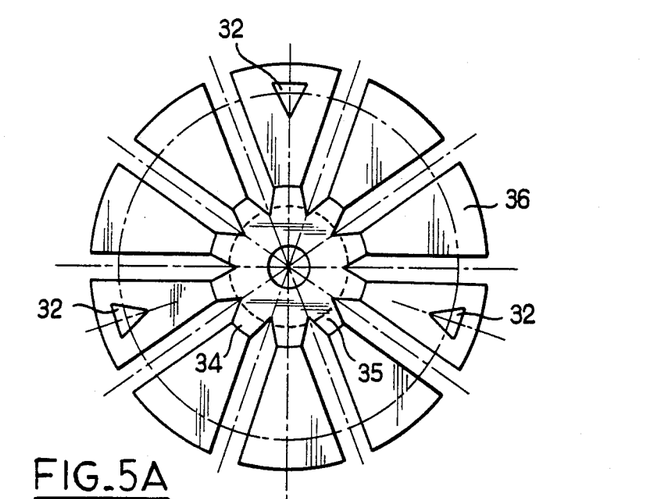
FIG. 5A is a top view of the connector of FIG. 5.

FIGS. 5 and 5A show the same views as FIGS. 4 and 4A in accordance with a second preferred variant of the terminal connector provided with three peripheral centering bores 32 which are distributed in a non-uniform manner on a circle having a diameter approximately double the diameter of the support of the cable to be connected.

FIG. 6 is a longitudinal section view of a complete splice between a cable 1 and a cable 1' by means of facing terminal connectors 31 and 31' in accordance with a first embodiment of the invention.

Since the structure is symmetrical except for the parts which ensure fluid-tightness of the splice, the elements constituting the left half of the figure will accordingly be described.

As illustrated in FIG. 6, an extension 62 of the cable core 2 beyond the cutting plane of the dielectric support 1 constitutes a first centering stud which penetrates into the bore 39 of the terminal connector 31 and permits alignment of the two parts with respect to each other. Fine positioning is carried out by optical sighting along the grooves. The reference numeral 70 designates the sleeve for retaining the tape winding at the stripped end of the cable opposite to the terminal connector. As appears from the figure, an O-ring seal 60 occupies the rear channel 35 of the terminal connector, a centering pin 63 occupies the two corresponding peripheral bores 32 of the annular flanges 36 of the two terminal connectors for ensuring alignment and centering of the two terminal connectors. Rigidification of the assembly consisting of terminal connector 31 and cable 1 is carried out by means of a heat-shrinkable sleeve 59 placed astride these two parts. Around the sleeve 59 is placed a biconical elastic seal 56 which is applied against a metallic wedge 57, said wedge being secured against rotation and applied against a flat annular elastic seal 58 which is abuttingly applied against the rear face of the annular flange 36.

The flat seal 58 has a central opening grooved with the same angular spacing as the part forming tail of the terminal connector and is made from an elastomer material, such as e.g. that known under the trade name Silastene. A conical centering ring 55 which is secured against rotation by the screw 64 completes the rigidification assembly.

The mechanical splice-protecting assembly comprises two sealing members 52 and 53 secured to each other and a clamping ring 54 whose threaded end cooperates with the thread 65 of the member 52. The shouldered portion 66 serves as an abutment member for the sealing member 53 and a seal 67 is compressed between the two members which are clamped together by the threaded ring 54. Two packing glands 51 rigidly fixed to the members 52 and 53 respectively serve to apply a pressure between the two end faces of the terminal connectors 31 and 31' by compressing the flat elastic annular seals 58. The presence of said annular seals is important since they are in compression and thus compensate for any play which might otherwise result from different expansion of the parts and guarantees a constant pressure in the plane of contact of the two terminal connectors.

The different operations which are necessary in order to form a splice of the type shown in FIG. 6 will now be described but only in regard to those operations which differ from the prior art as considered in particular with reference to French Patent Application No. 2,420,777 filed on Mar. 24, 1978 by the Assignee. When the cable end has been placed in a splicing bench and the protective claddings and jackets have been removed over a length determined by the bench setting, the tape 5 (shown in FIG. 1) which surrounds the central element of the cable is fixed by means of the elastic sleeve 70.

The different parts constituting the mechanical splice protection system and the parts required for rigidification of the cable and terminal connector assembly are then threaded on the cable in the order in which they are positioned on the completed splice. The last two parts introduced are the heat-shrinkable sleeve 59 and the O-ring seal 60 which has to be engaged on the cable by means of a suitable mounting unit since its diameter is smaller than that of the cable support. The tape 5 is then cut on the stripped portion of the cable and the optical fibers are dislodged from the grooves by sliding engagement of a ring, one internal face of which is complementary to the outer face of the cable support. Since the ring is displaced from the free end of the cable, the ends of the fibers are gathered together in two bundles which are maintained on each side of the cable by means of the retaining tool shown in FIGS. 7 and 8, thus ensuring freedom of access to the bare cable.

More specifically, the retaining tool essentially comprises a clamp 80 (FIGS. 7 and 8) which bears on the splicing bench and carries two articulated arms 81 and 82 shown in the vertical position, said arms being capable to pivot in the horizontal position perpendicular to the plane of the figure. The fibers 4 are placed behind the arms and bear on these latter by their natural elasticity.

Figure 7:
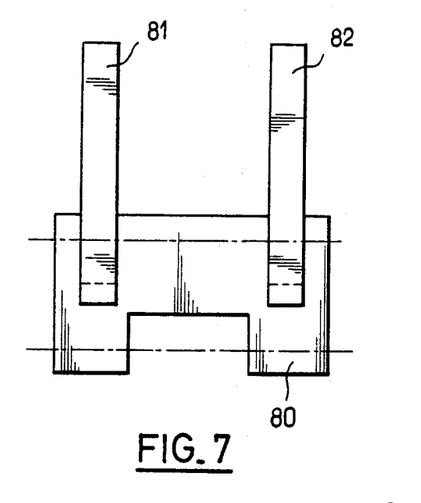
FIGS. 7 through 10 illustrate tools or assemblies employed in the practical application of the invention.
Figure 8:
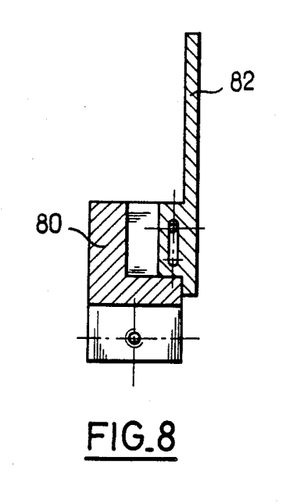

The ring which has served to dislodge the fibers from their grooves is subsequently removed. Decladding of the fibers is carried out at the same time over the prescribed length.

Figure 9:
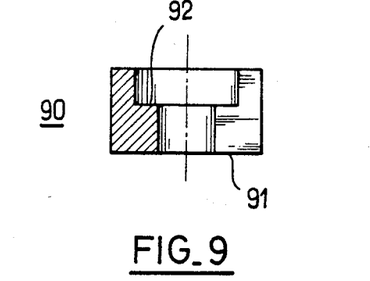
Figure 10:
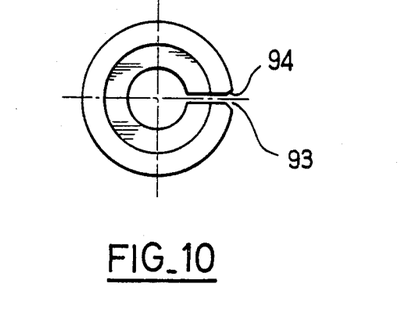

The cable support 1 is then subjected to untwisting with a view to reducing the pitch or helix angle of the grooves to zero on the stripped portion of the cable when the grooves are of the helical type. The cable is cut to the length corresponding to that of the stud projection 62 of the cable core and the portion of the support is re-cut in order to form the projecting stud. The stud 62 is engaged within the bore 39 of the terminal connector 31 and the grooves are visually aligned. A cylindrical part 90 shown in FIGS. 9 and 10 and constituted by a ring whose bore 91 has shoulder 92 serving as an abutment is introduced on the annular flange of the terminal connector. The diameter of the bore is close in value to the diameter D2 of the tail portion of the terminal connector prior to cutting. The ring has a longitudinal slot 93 for the insertion of a single optical fiber. The ring 90 is mounted so as to be abuttingly applied against the terminal connector 31 prior to releasing of the fibers by pivotal displacement of the retaining arms 81 and 82 (FIGS. 7 and 8). The fibers are accordingly opened-out around the ring. By rotating the ring, the fibers penetrate one by one into each groove through the slot 93. As is apparent from the figure, the slot 93 issues to the outside by rounded edges 94 so as to prevent any damage to the fiber on a sharp edge. Member 90 is then removed.

The O-ring seal 60 is then displaced in sliding motion so as to apply the fibers against the bottom of the grooves until it occupies its final position within the terminal connector channel 35. The terminal connector 31 and the cable support 1 are then bonded in position. On the right-hand side of the annular flange 36, an O-ring seal (not shown) is inserted by means of a conical tool into the channel 37 of the terminal connector 31 in order to apply the free ends of the fibers at the bottom of the grooves. The ends of the fibers are then bonded in position within the channel 37 and the O-ring seal which occupies said channel is removed. The heat-shrinkable sleeve 59 is placed in position and heated. The terminal connector 31 is cut in the plane Y—Y' (shown in FIGS. 4 and 5). This operation ensures at the same time the length adjustment of the optical fibers which are maintained in position within the channel 37 by bonding. In the manner described in the French Patent Application cited earlier and filed on Mar. 24, 1978 by the Assignee, the operation just mentioned is carried out by means of a double grain-size grinding-wheel which eliminates polishing of the fibers. The following step consists in positioning the members 58, 57, 56, 55 for rigidifying the cable and terminal connector assembly and securing said members against rotation (especially by means of the screw 64). The same procedure is adopted in the case of the second cable.

Alignment of the two terminal connectors is ensured by inserting centering pins 63 into complementary bores 32 of the two terminal connectors and by applying these latter one against the other. A refractive-index matching liquid may be deposited on the front faces prior to inter-engagement of the two terminal connectors. Locking of the protection assembly (members 52 and 53 secured in position by means of the ring 54) is then carried out. The packing glands 51 then serve to displace the rigidification members of the terminal connector and cable assemblies in order to compress the annular seals 58 and to establish a pressure on the contact face of the two terminal connectors.

Disassembly of a splice of this type is particularly simple since it is limited to unscrewing of the threaded ring 54 after releasing the packing glands 51 and disengagement of the two terminal connectors 31 and 31'.

According to a second preferred embodiment of the invention shown in FIG. 11 and in which the same members as those in FIG. 6 are given the same reference numerals, mechanical member 52 comprises a conical part 101 against which bears a portion of the biconical sail 56. Mechanical member 52 also comprises a rod 104 which projects longitudinally from said member 52 and which engages in a recess 106 made in the mechanical member 53 in such a way that the two members 52 and 53 form a unit. The presence of the pin 104 prevents any loss of eccentricity of the two terminal connectors 31 and 31' during clamping of ring 54.

As illustrated in FIG. 11, the seal 67 compressed between members 52 and 53 clamped together by the threaded ring 54 is fitted level with the junction of the two terminal connectors 31 and 31'. This seal 67 makes it possible to trap the index matching liquid deposited on the front faces of the two terminal connectors. Thus, the seal 67 ensures a perfect seal, making it possible to increase the service life of the splice.

The different operations which are necessary in order to form a splice of the type shown in FIG. 11 are the same as those described with reference to FIG. 6.

The splicing method according to the invention has been described hereinbefore with reference to cable elements of the grooved cylindrical type. Obviously, this method can also be applied to any other cable structure without departing from the scope of the invention.

Thus, in a case of a splicing of two cables of the flat type, each terminal connector of the flat type is made for example by molding two superimposed complementary parts whose respective outer faces have a slightly rounded shape in order to permit the insertion of an O-ring seal. Moreover, the longitudinal grooves which house the optical fibers are only made on the outer periphery of the upper part of the terminal connector.

In the case of splicing a cable of the grooved cylindrical type to a cable of the flat type, between the latter and a grooved cylindrical connector, like that shown at 31 in FIG. 3, is placed an intermediate flat connector like that described hereinbefore. This intermediate connector thus makes it possible to convert a flat structure into a grooved cylindrical structure.

What is claimed is:

1. A method for splicing two optical fiber transmission cables each provided with a dielectric support in which are housed optical fibers, said method comprising the following operating steps performed on each cable end:
  (a) the cable ends are stripped over a predetermined length;
  (b) the fibers thus freed are opened-out;
  (c) the support which has been freed from its fibers is cut at right angles to its axis and a terminal connector provided with grooves is fixed on the end of the support;
  (d) the fibers are turned down into the grooves of the terminal connector and are rigidly fixed therein, said turning down and fixing step including the following operations:
    a hollow member provided with a longitudinal slot having a width in the vicinity of the diameter of a fiber is arranged coaxially to the terminal connector and the member is rotated in such a manner as to ensure that the slot is placed successively opposite to each groove so as to permit introduction of the fibers successively within each groove of the terminal connector after the fibers have been released from the cable support, a first O-ring seal previously engaged on the cable end is slidably displaced along the terminal connector so as to apply the fibers to the bottom of the grooves of the terminal connector, the fibers are bonded in position within the grooves of the terminal connector, (e) the terminal connector as well as the fibers carried by this latter are cut at right angles to the axis of the connector;

(f) each support-connector assembly is fixed in position by rigidification means;

(g) the two cables are aligned by alignment means, said alignment step consisting in introducing within the terminal connector of the first cable at least one centering pin into a longitudinal opening formed in each terminal connector, the centering pin projecting from the cutting face of the terminal connector and engaging in a corresponding opening of the terminal connector of the second cable.

2. A method as claimed in claim 1, wherein each support has grooves distributed over its periphery in which is housed an optical fiber, and wherein each terminal connector comprises an annular flange in which is formed the longitudinal opening, the distance from the opening to the axis of the terminal connector being greater than the radius of the support.

3. A method as claimed in claim 2, wherein the annular flange of each terminal connector has three openings distributed at non-uniform intervals over the circumference having a diameter which is substantially equal to double that of the cable support.

4. A method as claimed in claim 2, wherein the grooves of each terminal connector have the same angular spacing as those of each support.

5. A method as claimed in claim 2, wherein after the alignment of the two cables, the method comprises a clamping operation for applying the respective faces of the two terminal connectors against each other.

6. A method as claimed in claim 5, wherein said clamping operation consists in compressing elastic seals against the end face of the annular flange of each terminal connector.

7. A method as claimed in claim 2, wherein after the sliding operation, the first O-ring seal is placed in a first channel machined in the terminal connector in the vicinity of the rear face of the annular flange and wherein a second O-ring seal is introduced by the front face of the terminal connector into a second channel machined in the vicinity of the front face of the annular flange, the bonding of the fibers into the grooves being made on the vicinity of the second O-ring seal which is then removed.

8. A method as claimed in claim 1, wherein the terminal connectors are obtained by molding a symmetrical part which, by cutting along its plane of symmetry, gives two paired connectors.

* * * * *